(12) United States Patent
Bommier et al.

(10) Patent No.: US 7,523,657 B2
(45) Date of Patent: Apr. 28, 2009

(54) METHOD AND DEVICE FOR MEASURING AIR TURBULENCE IN THE SURROUNDINGS OF AN AIRCRAFT

(75) Inventors: Francois Bommier, Pibrac (FR); Mael Reymond, Aussonne (FR)

(73) Assignee: AIRBUS France, Toulouse (FR)

( * ) Notice: Subject to any disclaimer, the term of this patent is extended or adjusted under 35 U.S.C. 154(b) by 0 days.

(21) Appl. No.: 11/909,794

(22) PCT Filed: Mar. 7, 2006

(86) PCT No.: PCT/FR2006/000504

§ 371 (c)(1),
(2), (4) Date: Sep. 26, 2007

(87) PCT Pub. No.: WO2006/103325

PCT Pub. Date: Oct. 5, 2006

(65) Prior Publication Data

US 2008/0190192 A1 Aug. 14, 2008

(30) Foreign Application Priority Data

Mar. 31, 2005 (FR) .................................. 05 03128

(51) Int. Cl.
*G01F 13/00* (2006.01)
(52) U.S. Cl. ...................... 73/170.02; 356/28; 356/28.5
(58) Field of Classification Search . 73/170.01–170.15; 356/27, 28, 28.5, 29
See application file for complete search history.

(56) References Cited

U.S. PATENT DOCUMENTS

| 5,216,477 | A | * | 6/1993 | Korb | .......................... 356/28.5 |
| 5,648,604 | A | | 7/1997 | Morbieu et al. | |
| 6,297,878 | B1 | | 10/2001 | Miller | |
| 6,963,291 | B2 | * | 11/2005 | Holforty et al. | ............. 340/945 |
| 7,284,421 | B2 | * | 10/2007 | Martin | ..................... 73/170.13 |
| 7,353,690 | B2 | * | 4/2008 | Solheim et al. | ............ 73/29.01 |
| 2003/0009268 | A1 | | 1/2003 | Inokuchi | |

OTHER PUBLICATIONS

PCT International Search Report dated Jun. 22, 2006.

* cited by examiner

*Primary Examiner*—Andre J Allen
*Assistant Examiner*—Jermaine Jenkins
(74) *Attorney, Agent, or Firm*—Dickinson Wright, PLLC

(57) ABSTRACT

A device for measuring air turbulence in the surroundings of an aircraft includes a measurement system having lidars which are mounted on the aircraft and which are intended to carry out, during a flight of the aircraft, twelve measurements of aerodynamic velocity in the environment surrounding the aircraft. The measurement system carries out the twelve measurements at four different measurement points, each time according to three predetermined axes. A central unit which, with the aid of the aerodynamic velocity measurements and of a first order predetermined mathematical model describing an aerodynamic velocity field as a function of twelve variables, determines an aerodynamic velocity field which exists in the environment of the aircraft and which is representative of the air turbulence.

14 Claims, 1 Drawing Sheet

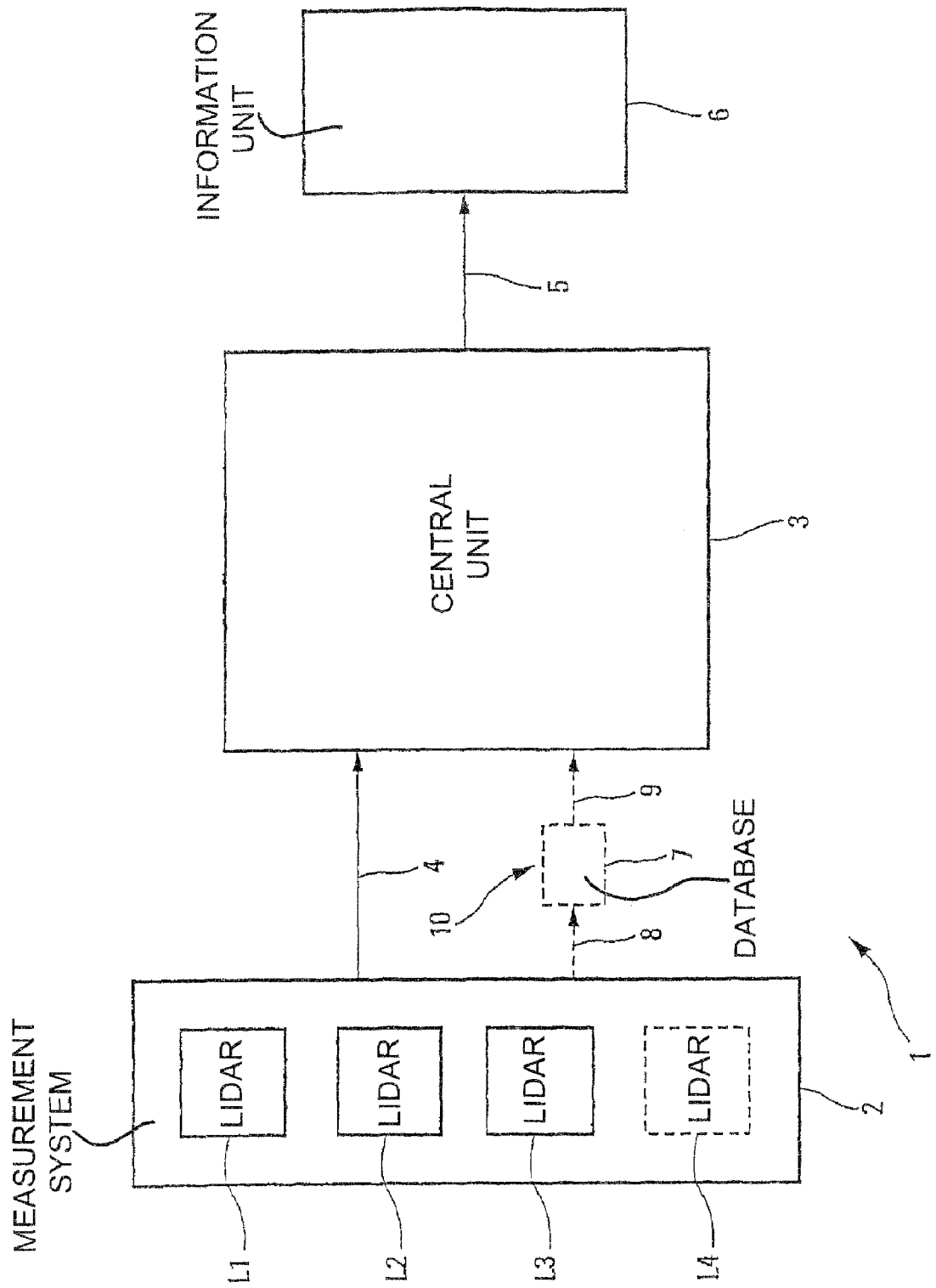

METHOD AND DEVICE FOR MEASURING AIR TURBULENCE IN THE SURROUNDINGS OF AN AIRCRAFT

1. Field of the Invention

The invention relates to a method and a device for measuring air turbulence in the surroundings of an aircraft, in particular of a transport airplane.

2. Background of the Related Art

More particularly, although not exclusively, the measured turbulence can be used to validate simulation models which will be used to test characteristics of an airplane in the laboratory, during the design or before the flight of said aircraft, and in particular to choose the most efficacious model from among a plurality of possible theoretical models.

For such an application, it is of course necessary that the measurements carried out be particularly accurate and reliable.

It is known that in addition to the natural heterogeneity of the aerodynamic velocity field (or turbulence field) in the environment surrounding the aircraft, there also exists a disturbance of this field in proximity to the aircraft, often over several tens of meters, which is produced by the passage of said aircraft. This disturbance endures in the wake produced by the passage of the aircraft. This of course makes it difficult to carry out accurate measurements.

SUMMARY OF THE INVENTION

The present invention relates to a particularly effective and reliable method of measurement for measuring air turbulence in the surroundings of an aircraft, in particular of a transport airplane, which method makes it possible to remedy the aforesaid drawbacks.

According to the invention, said method is noteworthy in that:

a) during a flight of the aircraft, twelve measurements of aerodynamic velocity in the environment surrounding said aircraft are carried out, with the aid of lidars which are mounted on the aircraft, said measurements being carried out at four different measurement points, each time according to three predetermined axes; and b) with the aid of said twelve measurements and of a first-order predetermined mathematical model describing an aerodynamic velocity field as a function of twelve variables, an aerodynamic velocity field which exists in said environment of the aircraft and which is representative of said turbulence of the air is determined.

Thus, by virtue of the invention, a measurement of the turbulence which is particularly accurate and reliable is obtained. Specifically:

on the one hand, because of the use of lidars, the various measurement points are distant from the aircraft, as specified below, thereby making it possible to carry out measurements in zones not disturbed by the passage of the aircraft, and therefore to measure the actual turbulence; and on the other hand, said mathematical model (of first-order describing an aerodynamic velocity field as a function of twelve variables) which is used to determine the turbulence takes into account the hypothesis according to which the aerodynamic velocity field is not uniform at the various measurement points, this corresponding to reality. This model takes account on the other hand of the hypothesis according to which the first derivatives of the aerodynamic velocity field are uniform, thereby presupposing the use of twelve variables (three components and nine first derivatives).

It is known that air turbulence is due to a nonuniform aerodynamic velocity field and therefore represents a disorderly agitation of the air subject to a flow in which the fluid filaments mix together instead of preserving their individuality.

Moreover, it is known that a lidar is a device making it possible to determine the position and the distance of an obstacle by reflection on the latter of an optical luminous radiation, generally emitted by a laser. The term lidar originates from the abbreviation of the expression "Light Detection And Ranging". The principle of the lidar relies on a transposition into the luminous or optical domain of the principle of a radar applied in the radioelectric domain.

In an advantageous manner, each lidar measures at the measurement point which is allocated to it three components of an aerodynamic velocity respectively according to said three predetermined axes, by carrying out for each component a measurement of the Doppler effect of a laser beam emitted and backscattered by particles present in a predetermined volume around said measurement point.

In step a), in a first embodiment, four lidars are used, each of which carries out measurements at one of said four measurement points, while in a second preferred embodiment, three lidars are used, two of said lidars carrying out each of the measurements at one of said measurement points, and the third lidar carrying out measurements at two successive instants during the flight of the aircraft so as to be able thus to carry out measurements at two different measurement points which correspond to the two remaining measurement points.

Within the framework of the present invention, said lidars can be arranged at any location on the aircraft where they are in a situation of being able to carry out the aforesaid measurements (on condition that the locations chosen are different from one another). However, in a particular embodiment applied to the second preferred embodiment above, said lidars are respectively arranged on a first front right porthole, a first front left porthole and a wing of the aircraft.

Furthermore, in an advantageous manner, said predetermined axes depend on the aircraft and are oriented towards the front. The frame of reference used is therefore tied to the aircraft.

The present invention also relates to a device for measuring air turbulence in the surroundings of an aircraft.

According to the invention, said device is noteworthy in that it comprises:

a measurement system comprising lidars which are mounted on the aircraft and which are intended to carry out during a flight of the aircraft twelve measurements of aerodynamic velocity in the environment surrounding said aircraft, said measurement system carrying out said measurements at four different measurement points, each time according to three predetermined axes; and a central unit which, with the aid of the measurements carried out by said measurement system and of a first-order predetermined mathematical model describing an aerodynamic velocity field as a function of twelve variables, determines an aerodynamic velocity field which exists in said environment of the aircraft, and which is representative of said turbulence of the air.

In a first embodiment, said central unit is mounted on the aircraft and determines the turbulence of the air during the flight of the aircraft.

In a second preferred embodiment, the device in accordance with the invention comprises, moreover, a recording means for recording in a database the measurements carried out by said measurement system, and said central unit determines the turbulence of the air on the ground after a flight, with the aid of the measurements recorded in said database during the flight.

Furthermore, advantageously, said measurement system comprises:

either four lidars, each of which carries out measurements at one of said four measurement points;

or three lidars. In this case, two of said lidars carry out each of the measurements at one of said measurement points, and the third lidar carries out measurements at two successive instants during the flight of the aircraft so as to be able thus to carry out measurements at two different measurement points which correspond to the two remaining measurement points. In this example, advantageously, said lidars are respectively arranged on a first front right porthole, a first front left porthole and a wing of the aircraft.

BRIEF DESCRIPTION OF THE DRAWING

The single FIGURE of the appended drawing will elucidate the manner in which the invention may be carried out. This FIGURE is a schematic diagram of a measurement device in accordance with the invention.

DETAILED DESCRIPTION OF THE INVENTION

The device 1 in accordance with the invention and diagrammatically represented in the FIGURE is intended to measure the turbulence of the air in the environment of an aircraft (not represented), in particular of a transport airplane. It is known that the turbulence of the air corresponds to an agitation superimposed on the mean motion of the air and constituted by disorderly motions, in continual transformation. Turbulence is encountered inside or in the neighborhood of clouds (for example in a storm cloud where oppositely directed vertical currents coexist). Turbulence in a clear sky also exists, either near the ground, or especially at very high altitude in proximity to jet streams.

According to the invention, said measurement device 1 comprises:

a measurement system 2 which comprises a plurality of lidars L1, L2, L3, L4. These lidars L1, L2, L3, L4 specified below are mounted on the aircraft and are intended to carry out, during a flight of said aircraft, twelve measurements M1 to M12 specified hereafter of aerodynamic velocity. These measurements M1 to M12 are carried out outside said aircraft in the environment close to the latter, but however at at least a predetermined distance from said aircraft, in particular at at least 30 meters. The said measurement system 2 carries out said twelve measurements at four different measurement points, each time with three measurements per measurement point, respectively according to three predetermined axes X, Y, Z; and a central unit 3 which, with the aid of the measurements carried out by said measurement system 2 and of an integrated mathematical model, determines an aerodynamic velocity field existing within said surroundings of the aircraft, which is representative of said turbulence of the air. This mathematical model is a first-order model which describes an aerodynamic velocity field as a function of twelve variables.

Thus, by virtue of the invention, a measurement of the turbulence which is particularly accurate and reliable is obtained. Specifically:

on the one hand, because of the use of lidars L1, L2, L3, L4, the various measurement points are distant from the aircraft, thereby making it possible:

to carry out measurements in zones not disturbed by the passage of the aircraft; and therefore to measure the actual atmospheric turbulence over the trajectory of the aircraft, but away from the disturbance generated by the latter; and on the other hand, said mathematical model (of first-order describing an aerodynamic velocity field as a function of twelve variables) which is used to determine the turbulence takes into account the hypothesis according to which the aerodynamic velocity field is not uniform at the various measurement points, this corresponding to reality. This model takes account, on the other hand, of the hypothesis according to which the first derivatives of said aerodynamic velocity field are uniform, thereby presupposing the use of twelve variables (three components and nine first derivatives specified below).

It is known that a lidar L1, L2, L3, L4 is a device making it possible to determine the position and the distance of an obstacle by reflection on the latter of an optical luminous radiation, generally emitted by a laser. The term lidar originates from the abbreviation of the expression "Light Detection And Ranging". The principle of the lidar relies on a transposition into the luminous or optical domain of the principle of a radar applied in the radioelectric domain.

Each lidar L1, L2, L3, L4 measures at the corresponding measurement point three components of an aerodynamic velocity respectively according to said predetermined three axes X, Y and Z, by carrying out for each component a measurement of the Doppler effect of a laser beam emitted and backscattered by the particles which are naturally present in a predetermined volume around said measurement point.

In a first embodiment, the device 1 in accordance with the invention comprises four lidars L1, L2, L3 and L4. Each of these four lidars L1 to L4 carries out three measurements at one of said four measurement points.

Furthermore, in a second preferred embodiment, said device 1 comprises only three lidars L1, L2 and L3. A first lidar L1 carries out three measurements at a first of said measurement points, a second lidar L2 carries out three measurements at a second of said measurement points, and the third lidar L3 carries out three measurements each time at one and the same position with respect to the aircraft, but at two successive instants during the flight of the aircraft so as to be able thus to carry out measurements at two different measurement points (spaced mutually apart by a distance representative of the flight of the aircraft between said two instants).

Within the framework of the present invention, said lidars L1, L2, L3, L4 can be arranged at any location (on the aircraft) where they can carry out the aforesaid measurements (on condition that the locations chosen are different from one another). However, in a particular embodiment applied to an airplane and to the second preferred embodiment above, said lidars L1, L2 and L3 are respectively arranged on a first front right porthole, a first front left porthole and a wing of the airplane.

Said axes X, Y and Z mentioned above depend on the aircraft and correspond, for example in the case of an airplane, respectively to the longitudinal axis of the airplane, a mean axis passing through the wings and which is orthogonal to said longitudinal axis, and an axis which is perpendicular to the plane formed by the two preceding axes.

Longitudinally, the measurement points should be sufficiently far from the aircraft, for example 30 meters, as not to be subject to the disturbances generated by the aircraft. Furthermore, laterally, two measurement points must be sufficiently far apart so as to be able to carry out different measurements, but not overly so as to continue to satisfy linear approximations taken into account in the theoretical model. Preferably, the lateral distance between two measurement points should not exceed the wingspan of the aircraft.

As indicated previously, the central unit 3 determines the turbulence of the air (in the form of an aerodynamic velocity field) with the aid of a first-order mathematical model which describes an aerodynamic velocity field as a function of twelve variables.

The twelve variables taken into account in this mathematical model represent:
- the three components Wx, Wy, Wz of the wind W, respectively according to said axes X, Y and Z;
- the three first derivatives of the wind W along the X axis:

$\partial Wx/\partial x, \partial Wy/\partial x, \partial Wz/\partial x;$

- the three first derivatives of the wind W along the Y axis:

$\partial Wx/\partial y, \partial Wy/\partial y, \partial Wz/\partial y;$ and

- the three first derivatives of the wind W along the Z axis:

$\partial Wx/\partial z, \partial Wy/\partial z, \partial Wz/\partial z.$

More precisely, said central unit 3 determines said aerodynamic velocity field, on the basis of said mathematical model and of said measurements, by taking account of the following considerations.

On the basis of the aforesaid components of the wind and of the gradients, it is possible to calculate the three components of the wind at an arbitrary point in space. For a point P fixed in a reference frame tied to the aircraft, the three components of the wind therefore correspond to a linear combination of the components of the wind and of the gradients. If the point P is a point at which a lidar L1, L2, L3, L4 makes a measurement, then this measurement is the projection onto the direction of measurement of the three components of the wind. This projection operation is likewise linear. For each measurement point P, there is therefore a linear relation between the components of the wind and of the gradients on the one hand, and the measurements of each lidar on the other hand. It is possible to write this relation in the form of a matrix. With M the vector of the twelve measurements of the lidars L1, L2, L3 and L4, V the vector of the components of the wind and of the gradients, and N is a matrix which links them, the following relation is obtained:

$M = N \cdot V$ in which:

$$M = \begin{bmatrix} M1 \\ M2 \\ M3 \\ M4 \\ M5 \\ M6 \\ M7 \\ M8 \\ M9 \\ M10 \\ M11 \\ M12 \end{bmatrix}$$

-continued $$V = \begin{bmatrix} Wx \\ \frac{\partial Wx}{\partial x} \\ \frac{\partial Wx}{\partial y} \\ \frac{\partial Wx}{\partial z} \\ Wy \\ \frac{\partial Wy}{\partial x} \\ \frac{\partial Wy}{\partial y} \\ \frac{\partial Wy}{\partial z} \\ Wz \\ \frac{\partial Wz}{\partial x} \\ \frac{\partial Wz}{\partial y} \\ \frac{\partial Wz}{\partial z} \end{bmatrix}$$

The matrix N depends on the directions of the measurements, the positions of the lidars L1, L2, L3, L4 on the aircraft, and the measurement distances of said lidars L1, L2, L3, L4. It is therefore possible to calculate the components of the estimated wind $\hat{V}$, with the aid of the following expression:

$\hat{V} = N^{-1} \cdot M$ where $N^{-1}$ is the matrix inverse of N.

It will be noted that according to the invention, the measurement system 2 emits as many measurement beams as necessary in optimized directions, and the central unit 3 carries out processings of said measurements, which make it possible to circumvent the impact of technological and installation constraints, in particular as regards the position of the measurement points and of the fact that the measured velocity is the projection of the aerodynamic velocity onto a sighting axis (or axis of emission of the measurement beam).

The results of the processings carried out by said central unit 3 can be transmitted by way of a link 5 to a standard information means 6, for example a viewing screen or a printer, which is capable of providing said results to an operator.

In a first embodiment, said central unit 3 is mounted on the aircraft and is connected by a link 4 to said measurement system 2. It thus determines the turbulence of the air directly during the flight of the aircraft, with the aid of the measurements carried out in the course of this flight.

On the other hand, in a second embodiment, which is partially represented by dashed lines in the FIGURE, the measurement device 1 furthermore comprises a recording means 10 which is connected by a link 8 to said measurement system 2 and which records, in flight, in a database 7 that it comprises, the measurements which are carried out by said measurement system 2. These results can be transmitted on the ground by way of a link 9 (a removable data transmission link) to the central unit 3. Said central unit 3 determines, in this case, the turbulence of the air on the ground after the flight, with the aid of the measurements recorded in said database 7 during the flight and transmitted by way of said link 9.

Moreover, as indicated previously, each lidar L1, L2, L3 and L4 performs three measurements. These measurements are made in directions which are not necessarily parallel to the X, Y and Z axes of the aircraft. These directions are not necessarily perpendicular. They are optimized so as to improve the quality of the measurements. They should be well differentiated in such a way that numerical inversion of the matrix N makes it possible to preserve good accuracy. They also satisfy other prerogatives: they are oriented towards zones in space where the aerodynamic field is the least disturbed possible by the passage of the aircraft. In particular, the most favorable points are all situated toward the front of the aircraft, and many are oriented upward (and frontward).

The invention claimed is:

1. A method of measuring air turbulence in the surroundings of an aircraft, wherein:
   a) during a flight of the aircraft, twelve measurements of aerodynamic velocity in the environment surrounding said aircraft are carried out, with the aid of lidars which are mounted on the aircraft, said measurements being carried out at four different measurement points, each time according to three predetermined axes; and
   b) with the aid of said twelve measurements and of a first-order, predetermined mathematical model describing an aerodynamic velocity field as a function of twelve variables, an aerodynamic velocity field which exists in said environment of the aircraft and which is representative of said turbulence of the air is determined.

2. The method as claimed in claim 1, wherein each of said lidars measures at said measurement point three components of an aerodynamic velocity respectively according to said three predetermined axes, by carrying out for each component a measurement of the Doppler effect of a laser beam emitted and backscattered by particles present in a predetermined volume around said measurement point.

3. The method as claimed in claim 1, wherein in step a), four of said lidars are used, each of which carries out measurements at one of said four measurement points.

4. The method as claimed in claim 1, wherein in step a), three of said lidars are used, two of said lidars carry out each of the measurements at one of said measurement points, and the third of said three lidars carries out measurements at two successive instants during the flight of the aircraft so as to be able thus to carry out measurements at two different measurement points which correspond to the two remaining measurement points.

5. The method as claimed in claim 4, wherein said three of said lidars are respectively arranged on a first front right porthole, a first front left porthole and a wing of the aircraft.

6. The method as claimed in claim 1, wherein said predetermined axes depend on the aircraft.

7. An aircraft, wherein it comprises a device capable of implementing the method specified under claim 1.

8. A device for measuring air turbulence in the surroundings of an aircraft, wherein it comprises:
   a measurement system comprising lidars which are mounted on the aircraft and which are intended to carry out during a flight of the aircraft twelve measurements of aerodynamic velocity in the environment surrounding said aircraft, said measurement system carrying out said twelve measurements at four different measurement points, each time according to three predetermined axes; and
   a central unit which, with the aid of the measurements carried out by said measurement system and of a first-order predetermined mathematical model describing an aerodynamic velocity field as a function of twelve variables, determines an aerodynamic velocity field which exists in said environment of the aircraft, and which is representative of said turbulence of the air.

9. The device as claimed in claim 8, wherein said central unit is mounted on the aircraft and determines the turbulence of the air during the flight of the aircraft.

10. The device as claimed in claim 8, wherein it comprises, moreover, a recording means for recording in a database the measurements carried out by said measurement system, and said central unit determines the turbulence of the air on the ground after a flight, with the aid of the measurements recorded in said database during the flight.

11. The device as claimed in claim 8, wherein said measurement system comprises four of said lidars, each of which carries out measurements at one of said four measurement points.

12. The device as claimed in claim 8, wherein said measurement system comprises three of said lidars, two of said three lidars carry out each of the measurements at one of said measurement points, and the third of said three lidars carries out measurements at two successive instants during the flight of the aircraft so as to be able thus to carry out measurements at two different measurement points which correspond to the two remaining measurement points.

13. The device as claimed in claim 12, wherein said three lidars are respectively arranged on a first front right porthole, a first front left porthole and a wing of the aircraft.

14. An aircraft, wherein it comprises a device such as that specified under claim 8.

* * * * *